United States Patent Office 3,159,634
Patented Dec. 1, 1964

3,159,634
NEW AMINOALKYLINDENES AND AMINOALKYL INDANYL ETHERS
David Jack and Robert Geoffrey William Spickett, Harpenden, and Charon Robin Ganellin, Welwyn Garden City, England, assignors, by mesne assignments, to Smith Kline & French Laboratories, Philadelphia, Pa., a corporation of Pennsylvania
No Drawing. Filed Oct. 31, 1961, Ser. No. 148,804
Claims priority, application Great Britain Nov. 8, 1960
5 Claims. (Cl. 260—268)

This invention relates to new aminoalkylindenes and aminoalkyl indanyl ethers having valuable pharmacodynamic activity.

In particular the compounds of this invention have central nervous system depressant activity and are useful as tranquilizers, sedatives and analgesics. In addition, certain of the compounds of this invention have diuretic, antihistaminic and anticonvulsant activity.

The new compounds of this invention may be represented by the following general structural formulae:

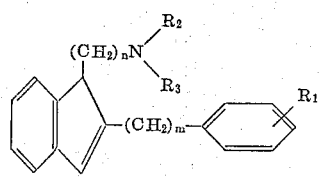

and

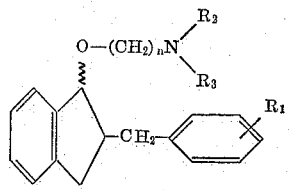

when:

$R_1$ is hydrogen, halogen, lower alkyl, lower alkoxy, trifluoromethyl or di-lower alkylamino;
$R_2$ and $R_3$ are lower alkyl or, when taken together, pyrrolidino, piperidino, piperazino, N-lower alkylpiperazino or morpholino;
$n$ is 2 or 3; and
$m$ is 0 or 1.

The benzenoid portion of the indene or indane nucleus is optionally substituted by inert substituents such as halogen, lower alkyl, lower alkoxy, trifluoromethyl or di-lower alkylamino.

The preferred 1-aminoalkyl-2-benzylindenes of this invention have the following formula:

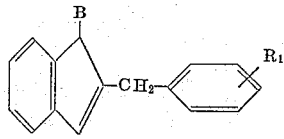

when:

$R_1$ is hydrogen, p-fluoro, p-chloro or o-methyl and
B is dimethylaminoethyl, piperidinoethyl, pyrrolidinoethyl, or 4-methylpiperazinopropyl.

The preferred aminoalkyl indanyl ethers of this invention have the following formula:

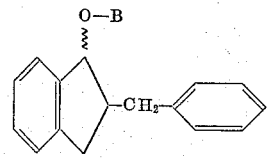

when:

B is dimethylaminoethyl, piperidinoethyl, pyrrolidinoethyl or 4-methylpiperazinopropyl.

The preferred 1-aminoalkyl-2-phenylindenes of this invention have the following formula:

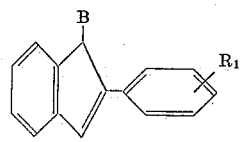

when:

$R_1$ is hydrogen, p-fluoro, p-chloro or o-methyl and
B is dimethylaminoethyl, piperidinoethyl, pyrrolidinoethyl or 4-methylpiperazinopropyl.

The 1-aminoalkyl-2-benzylindenes and 1-amino-alkyl-2-phenylindenes of this invention are advantageous and preferred.

This invention also includes nontoxic, pharmaceutically acceptable salts of the above defined bases formed with organic and inorganic acids. Such salts are easily prepared by methods known to the art, for example by treating the free base with an excess of an alcoholic or ethereal solution of the appropriate acid. Exemplary of such organic salts are those with maleic, fumaric, ascorbic, succinic, methanesulfonic, ethanedisulfonic, acetic, tartaric, salicylic, citric, lactic, malic, benzene sulfonic and theophylline acetic acids as well as with the 8-halotheophyllines, for example 8-bromotheophylline. Exemplary of such inorganic salts are those with hydrochloric, hydrobromic, sulfuric, sulfamic and phosphoric acids. Of course, these salts may also be prepared by the classical method of double decomposition of appropriate salts which is well-known to the art.

The terms "lower alkyl" and "lower alkoxy" where used herein denote groups having 1–4 carbon atoms inclusive, preferably 1–2 carbon atoms.

The compounds of this invention are prepared by the following synthetic procedure:

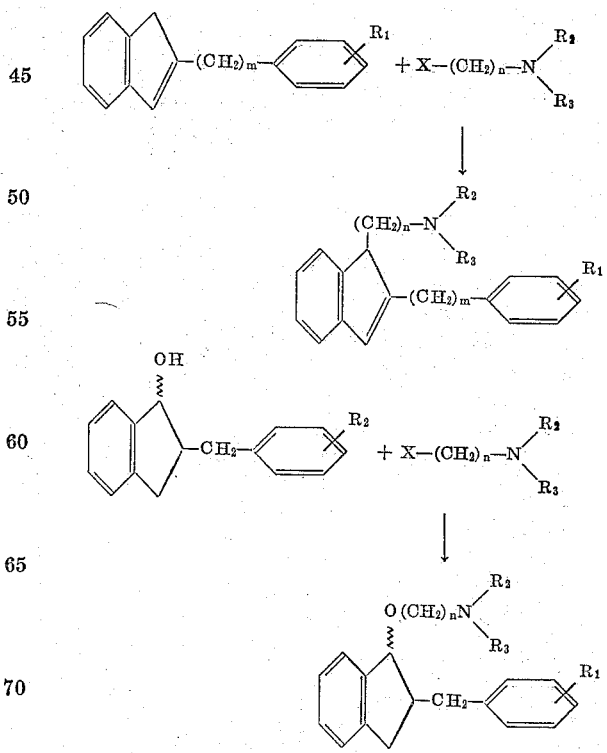

The terms $R_1$, $R_2$, $R_3$, $n$ and $m$ are as defined above and X is a reactive halogen, preferably chloro or bromo.

According to the above procedure the 2-benzyl (or phenyl)indenes and the β-2-benzyl-1-indanols are aminoalkylated to give the compounds of this invention. The reaction is carried out in an unreactive organic solvent such as an aromatic hydrocarbon for example toluene, benzene or xylene. Advantageously a condensing agent is present in the reaction mixture such as an alkali metal amide for example sodium or potassium amide or preferably an alkali metal hydride such as sodium or potassium hydride. An excess of the haloalkylamine and of the condensing agent is advantageously used. The reaction is carried out at elevated temperature, for example at the reflux temperature of the reaction mixture, for about 8-24 hours preferably about 12-18 hours.

The starting materials employed in the preparation of the compounds of this invention are prepared as follows:

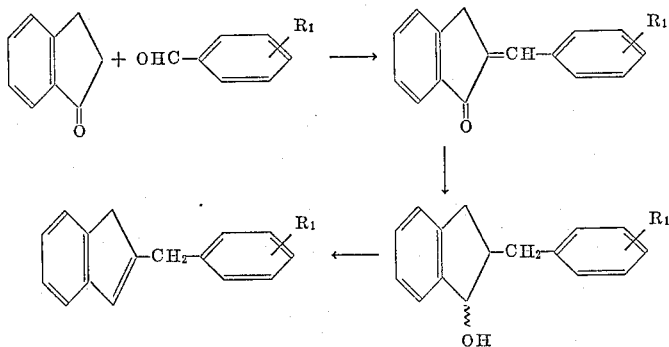

The term $R_1$ is as defined above.

According to the above procedure the 1-indanone is condensed with a benzaldehyde using as catalyst an acid such as sulfuric acid, sulfuric-acetic acid mixture or acetic anhydride or a base such as potassium hydroxide. Using an acid catalyst such as acetic anhydride the reaction is advantageously carried out at reflux temperature. Base catalyzed condensation often proceeds at room temperature.

The 2-benzylidene-1-indanone is reduced to the β-2-benzyl-1-indanol directly by the use of a bimetallic hydride such as lithium aluminum hydride or is reduced in two stages by catalytic reduction in alcohol to the 2-benzyl-1-indanone followed by reduction of the ketone with lithium aluminum hydride or sodium borohydride to give a mixture of α and β-2-benzyl-1-indanols. The β-indanols are the starting materials for the β-indanyl-ethers of this invention.

Dehydration of the indanols is carried out by treating with a dehydrating agent such as with potassium bisulfate, by heating in xylene with trace amounts of iodine, by treating with boiling decalin, or by heating in alcohol containing hydrochloric acid to give the 2-benzylindene starting materials.

Alternatively the starting materials are prepared by cyclizing a dibenzylacetyl chloride with aluminum chloride in carbon disulfide to give the 2-benzyl-1-indanone intermediates which are reduced either catalytically to give the β-indanol starting materials for the indanyl ethers of this invention or with sodium borohydride to give a mixture of α and β-indanols which is dehydrated by the procedures described above to give the 2-benzylindene starting materials.

Alternatively the starting materials are prepared by the Grignard reaction using 2-indanone and a benzylmagnesium chloride and dehydrating the resulting 2-benzyl-2-indanol with potassium bisulfate. Reacting 1-indanone with magnesium methyl carbonate, alkylating the intermediate chelate with a benzyl halide, hydrolyzing and decarboxylating gives the 2-benzyl-1-indanone intermediate.

The 2-phenylindene starting materials are prepared by condensing a 2-indanone with phenyllithium and dehydrating the resulting 2-phenyl-2-indanol with a dehydrating agent such as potassium bisulfate. Alternatively a 2-phenyl-1-indanone is reduced with a bimetallic hydride such as lithium aluminum hydride and the resulting 2-phenyl-1-indanol is dehydrated for example by use of ethanolic hydrochloric acid.

The following examples are not limiting but are illustrative of compounds of this invention and procedures for their preparation and will serve to make fully apparent all of the compounds embraced by the general formula given above.

*Example 1*

Dibenzylacetyl chloride (51.7 g.) is added dropwise to anhydrous powdered aluminum chloride (30 g.) in carbon disulfide (190 ml.) at —10° C. The reaction mixture is then slowly warmed to room temperature (20° C.) and finally, when the evolution of hydrogen chloride has subsided, it is refluxed for 10 minutes. The mixture is cooled, added to ice water (100 ml.), and acidified with concentrated hydrochloric acid (25 ml.). The mixture is then extracted with benzene and these extracts are dried with sodium sulfate and evaporated under reduced pressure. The residue is distilled in vacuo to give 2-benzyl-indan-1-one having a B.P. of 125° C./0.02 mm.

Sodium borohydride (2.75 g.) in water (15 ml.) is added dropwise with stirring to a solution in methanol (100 ml.) of 2-benzylindan-1-one. The temperature is maintained at 20° C. and the mixture of solid and liquid is stirred for a further 30 minutes. Water (200 ml.) is added to the reaction mixture which is then stirred for 10 minutes. The precipitate is then filtered off, washed with water twice and dried to give a mixture of α and β-2-benzyl-1-indanols having a M.P. of 65-78° C. If desired the β-isomer (M.P. 105-106° C.) may be isolated in crystalline form by crystallization of the mixture of α and β-isomers from light petroleum.

The mixture of α and β-2-benzyl-1-indanols (20.7 g.) is refluxed with decalin (250 ml.) for 12 hours using a Dean-Stark water trap. The decalin is then removed under reduced pressure and the residue is distilled in vacuo to give impure 2-benzyl-2-indene (12.3 g.) having a B.P. of 107-112° C./0.03 mm.

The 2-benzyl-2-indene is purified by treating with 2,4-dinitrophenylhydrazine and concentrated hydrochloric acid in 200 ml. of hot ethanol. The cooled mixture is filtered and the filtrate is evaporated. The residue is extracted with hot petroleum. The petroleum extracts are concentrated to 10 ml. and chromatographed on an alumina column. The eluant is evaporated to give 2-benzyl-2-indene which is recrystallized from light petrol (B.P. 30-40° C.) to give white needles having a M.P. of 46.5-48.0° C.

The sodium salt of the 2-benzyl-2-indenylium anion is prepared from a solution in dry toluene (160 mls.) of 2-benzyl-2-indene (10.35 g.) by the addition of sodium hydride (3.35 g. of 53.8% sodium hydride in oil). A solution of dimethylaminoethyl chloride (prepared from 8.62 g. of the hydrochloride) in toluene is added to the hot stirred suspension of the sodium salt and the mixture is refluxed for 17 hours. The mixture is extracted with dilute acid, the acid extracts basified and the separated oil recovered with ether. Distillation gives 1-(2-dimethyl-aminoethyl)-2-benzyl-2-indene in the form of a viscous yellow oil, B.P. 136–8° C./0.3 mm.

The hydrochloride is prepared by treating the free base with an excess of an alcoholic solution of hydrochloric acid.

*Example 2*

To a solution in dry toluene (100 mls.) of 2-benzyl-2-indene (10.35 g.) prepared as in Example 1, is added sodium hydride (2.14 g. of 53.8% sodium hydride in paraffin oil). A solution of 1-(2-chloroethyl)-piperidine (15.8 g.) is added and the mixture refluxed for 16 hours. On working up 1-(2-piperidinoethyl)-2-benzyl-2-indene in the form of a viscous oil is obtained. This oil, dissolved in ether, is converted into its hydrochloride by addition of a solution of dry HCl gas in ether. The hydrochloride, M.P. 250–253° dec., gives pale yellow plates when recrystallized from ethanol.

*Example 3*

1-[3-(4-methylpiperazino)-propyl]-2-benzyl-2 - indene is prepared from 2-benzyl-2-indene and 4-methylpiperazinopropyl chloride in a manner similar to that described in Example 1. The free base has a B.P. of 195–200° C./$5 \times 10^{-4}$ mm.

*Example 4*

2-benzylindan-1-one (2.23 g.), prepared as in Example 1, is catalytically reduced with a 10% palladium on charcoal catalyst (0.05 g.) in ethanol at atmospheric pressure at 50–60° C. Hydrogen (172 ml.) is absorbed in 4 hours. After removal of the catalyst, the solvent is evaporated to leave a pale yellow oil (2.2 g.) which solidifies on standing. Unchanged ketone is removed by treatment with Girard's reagent and the non-ketonic material is crystallized once from light petroleum, the product having a M.P. of 84–94° C. Recrystallization from light petroleum gives pure β-2-benzyl-1-indanol, M.P. 105–6° C. The β-2-benzyl-1-indanol prepared in the above manner is then reacted with 1-(2-chloroethyl)-piperidine in a manner similar to that described in Examples 1 and 2 to form 2-piperidinoethyl 1-(2-β-benzyl) indanyl ether, B.P. 142–52° C./$3 \times 10^{-4}$ mm.

*Example 5*

β-2-benzyl-1-indanol, prepared as in Example 4, is reacted with 4-methylpiperazinylpropyl chloride in a manner similiar to that described in Example 1 to form 3-[1-(4-methyl)-piperazinyl]-propyl 1-(2-β-benzyl)indanyl ether.

*Example 6*

β-2-benzyl-1-indanol, prepared as in Example 4, is reacted with 2-dimethylaminoethyl chloride in a manner similar to that described in Example 1 to form 2-dimethylaminoethyl 1-(2-β-benzyl)indanyl ether. The hydrochloride, recrystallized from methylethyl ketone/ether, has an M.P. of 124–126° C.

*Example 7*

2-indanone (44 g., 0.33 mol.) is added to a stirred solution of benzyl magnesium chloride (from 12.2 g. of magnesium and 63.3 g. of benzyl chloride in 250 ml. of ether) at such a rate as to maintain a gentle reflux. The mixture is refluxed for two hours and then poured into ammonium chloride solution. The solvent layer is separated and the aqueous layer extracted with ether. The combined ether solutions are dried and evaporated to leave a red oil which on trituration with light petroleum gives a white solid. This on crystallization from light petroleum gives 2-benzyl-2-indanol, M.P. 67–75° C. Recrystallization from light petroleum gives the pure compound, M.P. 76–8° C.

A mixture of 2-benzyl-2-indanol (5 g.) and potassium bisulfate (5 g.) is heated at 150° C. for 10 minutes. Water is then removed in vacuo (12 mm.) and the residue distilled in vacuo to yield 3.5 g. of 2-benzyl-2-indene B.P. 104–8° C./0.06 mm. The 2-benzyl-2-indene is then reacted with dimethylaminoethyl chloride in the manner described in Example 1 to form 1-(2-dimethylaminoethyl)-2-benzyl-2-indene.

The following 2-substituted-benzyl-2-indanols and 2-substituted-benzylindenes are prepared in a manner similar to that described above for 2-benzyl-2-indanol and 2-benzyl-2-indene.

(*a*) 2-p-chlorobenzyl-2-indanol: Prepared from p-chlorobenzyl magnesium chloride and 2-indanone, M.P. 143.5–145° C. from light petroleum. 2-p-chlorobenzyl-2-indene: Prepared by dehydration of 2-p-chlorobenzyl-2-indanol, B.P. 130° C./0.03 mm.

(*b*) 2-p-fluorobenzyl-2-indanol: Prepared from p-fluorobenzyl magnesium chloride and 2-indanone, M.P. 104–6° C. from light petroleum. 2-p-fluorobenzyl-2-indene: Prepared by dehydration of 2-p-fluorobenzyl-2-indanol, B.P. 108° C./0.01 mm.

(*c*) 2-o-methylbenzyl-2-indanol: Prepared from o-methylbenzyl magnesium chloride and 2-indanone, B.P. 116–124° C./0.01 mm. 2-o-methylbenzyl-2-indene: Prepared by dehydration of 2-o-methylbenzyl-2-indanol, B.P. 120° C./0.02 mm.

Alkylation of the above prepared indenes with dimethylaminoethyl chloride as described in Example 1 gives:

(*a*) 1-(2-dimethylaminoethyl)-2-p-chlorobenzyl-2-indene, B.P. 160° C./0.03 mm.

(*b*) 1-(2-dimethylaminoethyl)-2-p-fluorobenzyl-2-indene, B.P. 150–154° C./0.03 mm. Hydrochloride salt, M.P. 180–183° C.

(*c*) 1 - (2 - dimethylaminoethyl) - 2 - o - methylbenzyl-2-indene. Hydrochloride salt, M.P. 226–228° C.

*Example 8*

1-(2-piperidinoethyl)-2-p-fluorobenzyl-2-indene is prepared by alkylation of 2-p-fluorobenzyl-2-indene with 1-(2-chloroethyl)-piperidine in the manner described in Examples 1 and 2. The hydrochloride, which separates out on treatment of the reaction mixture with dilute hydrochloric acid, has a M.P. of 243–5° C. when recrystallized from isopropanol.

*Example 9*

To a solution of 1-indanone (67.2 g.) and p-ethoxybenzaldehyde (76.5 g.) in 130 ml. ethanol is added dropwise 67 ml. of 4% alcoholic KOH with stirring and cooling (ice-salt bath) to maintain the temperature below 15° C. The product is filtered off, washed on the filter with ethanol until the washings are colorless, dissolved in hot ethanol, charcoaled, and allowed to crystallize to give pale yellow, flat prisms of 2-(p-ethoxybenzylidene)-1-indanone having a M.P. 123–124.5° C.

The following compounds are prepared by the same method:

2-(p-dimethylaminobenzylidene)-1-indanone, M.P. 163–7° C.
2-(p-trifluoromethylbenzylidene)-1-indanone, M.P. 181–3° C.
2-(p-methoxybenzylidene)-1-indanone, M.P. 142–3.5° C.
2-benzylidene-6-methoxy-1-indanone, M.P. 132–4° C.
2-benzylidene-6-chloro-1-indanone, M.P. 158–9° C.

Hydrogen is admitted to an agitated suspension of 101.0 g. of 2(p-ethoxybenzylidene)-1-indanone and 0.386 g. of palladium (10% on charcoal) catalyst in 400 ml. ethanol. After 24 hours the catalyst is removed by filtration and the filtrate is concentrated and allowed to crystallize. The product is obtained as white prisms, having an M.P. 58–59.5° C.

The following compounds are prepared by the same method:

2-(p-dimethylaminobenzyl)-1-indanone, M.P. 79–81.5° C.
2-(p-trifluoromethylbenzyl)-1-indanone, M.P. 181–3° C.
2-(p-methoxybenzyl)-1-indanone, oil.
2-benzyl-6-methoxy1-indanone, M.P. 59–63° C.
2-benzyl-6-chloro-1-indanone, M.P. 45–6° C.

A solution of 53.0 g. of 2-(p-ethoxybenzyl)-1-indanone in dry ether is added dropwise to lithium aluminum hydride (2.2 g.) in dry ether with stirring under reflux. The reaction mixture is then poured onto crushed ice and acidified to give 2-(p-ethoxybenzyl)-1-indanol.

The following compounds are prepared by the same method:

2-(p-dimethylaminobenzyl)-1-indanol, M.P. 102–103.5° C.
2-(p-trifluoromethylbenzyl)-1-indanol, M.P. 137–40° C.
2-(p-methoxybenzyl)-1-indanol.
2-benzyl-6-methoxy-1-indanol, M.P. 107–109.5° C.
2-benzyl-6-chloro-1-indanol, oil.

A solution of 41.7 g. of 2-(p-ethoxybenzyl)-1-indanol in 200 ml. dry xylene is refluxed in a Dean Stark water collecting apparatus and portions of iodine crystals (total 50 mg.) are added at intervals until the red color persists. The solution is refluxed for 6½ hours.

The reaction solution is washed several times with saturated aqueous sodium bisulfite, dried and evaporated to leave the product as an off-white solid. Crystallization of the latter from petroleum (B.P. 60–80° C.) gives white prisms of 2-(p-ethoxybenzyl)-2-indene having an M.P. 73.5–76° C.

Treatment of 2-(p-ethoxybenzyl)-2-indene with diethylaminoethyl chloride as in Example 1 gives 1-(2-diethylaminoethyl-2-(p-ethoxybenzyl)-2-indene which is treated with an excess of ethanolic hydrochloric acid to give the hydrochloride salt, M.P. 178–179.5° C.

Similarly reacting 2-(p-ethoxybenzyl)-2-indene with 1-(2-chloroethyl)pyrrolidine gives 1-(2-pyrrolidinoethyl)-2-(p-ethoxybenzyl)-2-indene.

*Example 10*

A solution of 27.0 g. of 2-(p-trifluoromethylbenzyl)-2-indanol made as in Example 9 in 450 ml. ethanol containing 75 ml. concentrated hydrochloric acid is refluxed for 4 hours, and then concentrated to low volume. The residue is neutralized with dilute sodium hydroxide and extracted with ether. The ethereal extracts are dried and evaporated and the resulting residue is crystallized twice from isopropanol to give 2-(p-trifluoromethylbenzyl)-2-indene as white needles, having a M.P. 62.5–64.5° C.

Reacting 2-(p-trifluoromethylbenzyl)-2-indene with diethylaminoethyl chloride as in Example 1 yields 1-(2-diethylaminoethyl)-2-(p-trifluoromethylbenzyl)-2-indene.

*Example 11*

Dehydrating 2-(p-dimethylaminobenzyl)-1-indanol, prepared as in Example 9, by refluxing in an ethanol solution containing hydrochloric acid as in Example 10 gives 2-(p-dimethylaminobenzyl)-2-indene, M.P. 74–76° C.

Condensing 2-(p-dimethylaminobenzyl)-2-indene with diethylaminoethyl chloride as in Example 1 gives 1-(2-diethylaminoethyl)-2-(p-dimethylaminobenzyl)-2-indene.

The free base is treated with an excess of glacial acetic acid to give the acetate salt.

*Example 12*

Thirty-six grams of 2-(p-methoxybenzyl)-1-indanol is ground in a mortar with 37.0 g. of fused potassium bisulfite. The mixture is transferred to a flask and heated for 30 minutes at 150° C. at 12 mm. The mixture is cooled and extracted with benzene. The benzene extract is evaporated and distilled. The product is redistilled and crystallized from petroleum to give 2-(p-methoxybenzyl)-2-indene, M.P. 61–65° C.

Reacting 2-(p-methoxybenzyl)-2-indene with N-morpholinylethyl chloride as in Example 1 gives 1-(2-morpholinoethyl)-2-(p-methoxybenzyl)-2-indene.

*Example 13*

A toluene solution of 5.0 g. of β-2-benzyl-6-methoxy-1-indanol, prepared by lithium aluminum hydride reduction of 2-benzylidene-6-methoxy-1-indanone made as in Example 9, is treated with an excess of sodium hydride and 7.0 g. of 1-(2-chloroethyl)-piperidine and the mixture is refluxed for 15 hours. Working up as in Example 1 gives 1-(2-β-benzyl-6 methoxy)indanyl 2-piperidinoethyl ether.

Similarly using 5.0 g. of β-2-benzyl-6-chloro-1-indanol, prepared by lithium aluminum hydride reduction of the corresponding indanone made as in Example 9, in the above reaction gives 1-(2-β-benzyl-6-chloro)indanyl 2-piperidino ethyl ether.

Treatment of the base with hydrogen bromide in ether gives the hydrobromide salt.

*Example 14*

2-benzyl-6-methoxy-1-indanol, prepared as in Example 9 is dehydrated by refluxing with alcoholic hydrochloric acid as in Example 10 to give 2-benzyl-5-methoxy-1-indene, M.P. 46–51° C. Condensing this indene with 2-piperazinopropyl chloride by the procedure of Example 1 gives 1-(2-piperazinopropyl)-2-benzyl-6-methoxy-2-indene.

Similarly dehydrating 2-benzyl-6-chloro-1-indanol, prepared as in Example 9, and condensing the resulting indene with dimethylaminopropyl chloride furnishes 1-(2-dimethylaminopropyl)-2-benzyl-6-chloro-2-indene.

*Example 15*

To a stirred solution of phenyllithium (prepared under nitrogen atmosphere from lithium, 4.16 g., and bromobenzene, 47.1 g., in dry ether, 400 ml.) is added a solution of 2-indanone (33.0 g.). The mixture is stirred and refluxed under an atmosphere of nitrogen for three hours. The cooled mixture is treated with ice water, the resulting ethereal layer separated and dried. On removal of the solvent, 35.5 g. of an oily residue is left which is separated into unchanged 2-indanone, B.P. 66° C./0.05 mm., and 2-phenyl-2-indanol, B.P. 130° C./0.03 mm.

The above 2-phenyl-2-indanol (9.5 g.) is heated with potassium bisulfate (9.5 g.) at 180° C. for 90 minutes. The residue is triturated with water and the resulting phenyl-indene is extracted with chloroform. After removal of the solvent, the residue is crystallized from ethanol to give 2-phenyl-2-indene in colorless plates, M.P. 169–171° C.

To a suspension of sodium hydride (1.5 g. of 53.8% suspension in oil) in dry toluene (100 ml.) is added the 2-phenyl-2-indene (6.5 g.) prepared in the aforementioned manner and the mixture is refluxed until no more hydrogen is evolved (4 hours). A solution of 2-dimethylaminoethyl chloride in toluene (prepared from 10.05 g. of the hydrochloride) is then added and the resultant mixture is refluxed overnight. The cooled mixture is extracted several times with dilute hydrochloric acid, the acid extracts are basified and the liberated base is taken up in ether. After drying over sodium sulfate the solvent is removed to leave 1-(2-dimethylaminoethyl)-2-phenyl-2-indene in the form of a light yellow oil. The crude base is converted into the hydrochloride by acidification, yielding a pale yellow solid from ethanol, M.P. 212–214° C.

*Example 16*

A solution of 2-phenylindanone (100 g.) in a mixture of dry benzene (200 ml.) and dry ether (50 ml.) is added dropwise to a stirred suspension of lithium aluminum hydride (5.69 g.) in dry ether (50 ml.). The reaction mixture is refluxed for 2 hours and then stirred at room temperature for 20 hours. Ice (20 g.) is then added to the reaction mixture, followed by 20% sulfuric acid (100 ml.). The benzene-ether layer is separated, washed successively with dilute sulfuric acid, dilute sodium carbonate solution and then with water. After drying over sodium sulfate, the solvent is removed to leave 100 g. of a mixture of isomeric 2-phenyl-1-indanols in the form of a viscous oil.

The mixture of isomeric 2-phenyl-1-indanols is dehydrated by boiling in ethanol (250 ml.) containing concentrated hydrochloric acid (25 ml.) for one hour. After cooling, the resulting solid is filtered and crystallized from benzene-alcohol to yield 2-phenyl-2-indene, M.P. 169–170° C.

The 2-phenyl-2-indene is alkylated with 3-dimethyl aminopropyl chloride in toluene in the presence of sodium hydride as in Example 1. The hydrochloride of 1-dimethylaminopropyl-2-phenyl-2-indene separates on acidification of the reaction mixture and is separated and crystallized from ethanol, M.P. 213–214° C.

Similarly alkylating 2-phenyl-2-indene with 4-methyl-1-chloropropylpiperazine gives 1-(4-methylpiperazinopropyl)-2-phenyl-2-indene.

*Example 17*

A toluene solution containing 15.0 g. of 1-(2-chloroethyl)pyrrolidine is added to 10.4 g. of 2-benzyl-2-indene in toluene containing sodium hydride. Refluxing the mixture for 12 hours, then working up as in Example 1 gives 1-(2-pyrrolidinoethyl)-2-benzyl-2-indene.

The base is treated with an excess of maleic acid in ethyl acetate to give the maleate salt.

*Example 18*

Reaction of 6.5 g. of 2-phenyl-2-indene, prepared as in Example 15, with excess 2-dimethylaminopropyl chloride in toluene solution containing sodium hydride by refluxing overnight gives 1-(2-dimethylaminopropyl)-2-phenyl-2-indene.

*Example 19*

Five grams of 2-(p-methoxybenzylidene)-1-indanone, prepared as in Example 9, is slowly extracted into a refluxing solution of lithium aluminum hydride (1.0 g.) in dry ether. Water is added to decompose the resulting complex. The ether solution is separated, dried, evaporated and the residue is recrystallized from petroleum to give β-2-(p-methoxybenzyl)-1-indanol. Reacting this β-indanol with excess dimethylaminoethyl chloride as in Example 1 gives 2-dimethylaminoethyl-1-(2-β-p-methoxybenzyl)indanyl ether.

What is claimed is:
1. A chemical compound selected from the group consisting of compounds of the formulae:

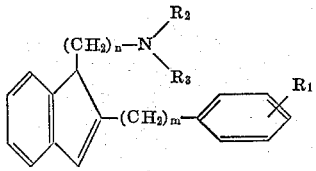

and

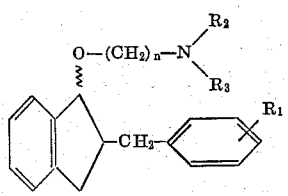

in which:

$R_1$ is a member selected from the group consisting of hydrogen, halogen, lower alkyl, lower alkoxy, trifluoromethyl and di-lower alkylamino;

$R_2$ and $R_3$ are members selected from the group consisting of lower alkyl and, when taken together, pyrrolidino, piperidino, piperazino, N-lower alkylpiperazino and morpholino;

$n$ has a value of two to three and $m$ has a value of zero to one and nontoxic, pharmaceutically acceptable acid addition salts thereof.

2. A chemical compound having the formula:

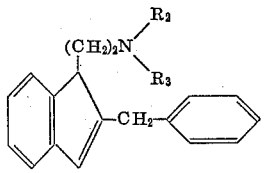

in which $R_2$ and $R_3$ are lower alkyl having 1–4 carbon atoms.

3. A chemical compound having the formula:

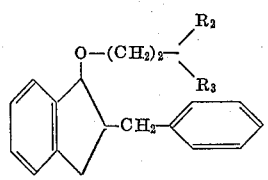

in which $R_2$ and $R_3$ are lower alkyl having 1–4 carbon atoms.

4. A chemical compound having the formula:

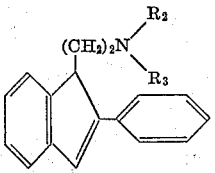

in which $R_2$ and $R_3$ are lower alkyl having 1–4 carbon atoms.

5. A chemical compound having the formula:

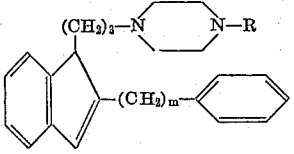

in which $m$ has a value of zero to one and R is lower alkyl having 1–4 carbon atoms.

References Cited in the file of this patent
UNITED STATES PATENTS

| | | |
|---|---|---|
| 2,441,069 | Hoffmann et al. | May 4, 1948 |
| 2,479,744 | Hoffmann et al. | Aug. 23, 1949 |
| 2,670,371 | Cusic | Feb. 23, 1954 |
| 2,794,048 | Richter et al. | May 28, 1957 |
| 2,798,888 | Ueberwasser | July 9, 1957 |
| 2,884,456 | Campbell | Apr. 28, 1959 |
| 2,916,490 | Schenck et al. | Dec. 8, 1959 |
| 2,970,149 | Huebner | Jan. 31, 1961 |
| 2,982,783 | Schenck et al. | May 2, 1961 |

UNITED STATES PATENT OFFICE
CERTIFICATE OF CORRECTION

Patent No. 3,159,634            December 1, 1964

David Jack et al.

It is hereby certified that error appears in the above numbered patent requiring correction and that the said Letters Patent should read as corrected below.

Column 10, lines 25 to 32, the formula should appear as shown below instead of as in the patent:

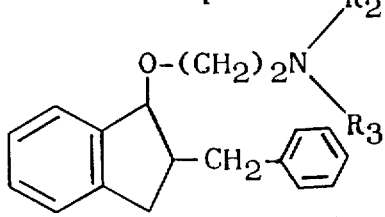

Signed and sealed this 13th day of April 1965.

(SEAL)
Attest:

ERNEST W. SWIDER
Attesting Officer

EDWARD J. BRENNER
Commissioner of Patents